United States Patent [19]

Taubitz et al.

[11] Patent Number: 4,943,399
[45] Date of Patent: Jul. 24, 1990

[54] CONTINUOUS PREPARATION OF MOLDING MATERIALS BASED ON POLYPHENYLENE ETHERS AND NYLONS

[75] Inventors: Christof Taubitz, Wachenheim; Hermann Gausepohl, Mutterstadt; Erhard Seiler, Ludwigshafen; Klaus Boehlke, Hessheim; Lothar Schlemmer, Maxdorf, all of Fed. Rep. of Germany

[73] Assignee: BASF Aktiengesellschaft, Ludwigshafen, Fed. Rep. of Germany

[21] Appl. No.: 349,968

[22] Filed: May 8, 1989

Related U.S. Application Data

[63] Continuation of Ser. No. 146,182, Jan. 20, 1988, abandoned.

[30] Foreign Application Priority Data

Jan. 29, 1987 [DE] Fed. Rep. of Germany ....... 3702582

[51] Int. Cl.$^5$ ..................... B29B 7/84; C08L 71/12; C08L 77/00
[52] U.S. Cl. ............................... 264/101; 264/211.13; 264/211.18; 264/211.21; 264/211.23; 264/211.24; 525/66; 525/68; 525/391; 525/392; 525/397; 525/905
[58] Field of Search ..................... 264/211.12, 211.18, 264/211.21, 211.23, 211.24, 101; 525/392, 391, 397

[56] References Cited

U.S. PATENT DOCUMENTS 3,379,792  4/1968  Finholt .
4,338,421  7/1982  Maruyama et al. .
4,654,405  3/1987  Jalbert et al. ................... 525/392
4,751,268  6/1988  Taukitz et al. ................... 525/392

FOREIGN PATENT DOCUMENTS 2054623  2/1981  United Kingdom .

Primary Examiner—Jacob Ziegler
Attorney, Agent, or Firm—Oblon, Spivak, McClelland, Maier & Neustadt

[57] ABSTRACT

Thermoplastic molding materials based on polyphenylene ethers and nylons are prepared in an extruder by a continuous process in which a modified polyphenylene ether is prepared in a first zone of the extruder and is then mixed with nylons and, if required, further additives in one or more further zones.

4 Claims, No Drawings

CONTINUOUS PREPARATION OF MOLDING MATERIALS BASED ON POLYPHENYLENE ETHERS AND NYLONS

This application is a continuation of application Ser. No. 146,182 filed on Jan. 20, 1988 now abandoned.

The present invention relates to a continuous process for the preparation of thermoplastic molding materials based on polyphenylene ethers (PPE) and nylons in an extruder.

Thermoplastic molding materials based on polyphenylene ethers and nylons are disclosed in, for example, U.S. Pat. No. 3 379 792, GB-A No. 20 54 623, EP-A Nos. 24 120 and 46 040. They are prepared by metering PPE and nylon simultaneously into an extruder and mixing the molten components. However, because of the incompatibility of PPE and nylons, the mechanical properties of moldings produced from the molding materials are unsatisfactory.

In U.S. Pat. No. 4 338 421, PPE and nylon are mixed with one another at from 200° to 330°C. for from 1 to 10 minutes. The molding materials prepared by this process also do not give moldings having satisfactory properties.

It is an object of the present invention to provide a process for the preparation of molding materials based on PPE and nylons which give molding materials having improved properties.

We have found that this object is achieved, according to the invention, by a process as claimed in claim 1.

The process is preferably carried out in singlescrew or twin-screw extruders. These preferably consist of individual barrels which have thermostatable jackets. There are no restrictions with regard to the design of the screws, and conveyor elements (with or without leading flight edges), kneading elements and/or mixing elements may be present. It is also possible, and frequently advantageous, to use baffles or backward-conveying elements in parts, ie. sections, of the extruder in order to influence or control the residence time and mixing characteristics.

Twin-screw extruders having screws rotating in the same direction are particularly preferred because of the self-purging characteristics and the better adjustability of the residence time spectrum. The extruder is divided into 2 or more, preferably 3 and if necessary even more zones.

In the novel process, a modified polyphenylene ether A is first prepared, in a first zone of the extruder, by reacting ($a_1$) from 50 to 99.95% by weight of a polyphenylene ether, ($a_2$) from 0 to 45% by weight of a vinylaromatic polymer ($a_3$) from 0.05 to 10% by weight of ($a_{31}$) an $\alpha,\beta$-unsaturated carboxylic acid or its derivatives of the general formula I

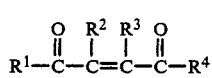

where $R^1$ and $R^4$ are each hydroxyl or aryloxy, alkoxy, aralkoxy or cycloalkoxy, each of not more than 12 carbon atoms, or together form —O— or —$NR^5$—, $R^2$ and $R^3$ are each hydrogen, alkyl or cycloalkyl, each of not more than 12 carbon atoms, aryl or chlorine, or together form alkylene of 4 to 12 carbon atoms, $R^5$ is hydrogen or alkyl, cycloalkyl, aralkyl or aryl, each of not more than 12 carbon atoms, which in turn may be substituted by $C_1$-$C_4$-alkyl or -alkoxy, ($a_{32}$) a monomer containing amide groups and a polymerizable double bond and/or ($a_{33}$) a monomer containing lactam groups and a polymerizable double bond, and in addition ($a_4$) from 0 to 80% by weight of further graft monomers and ($a_5$) from 0 to 20% by weight of a free radical initiator, the percentages in each case being based on the total weight of components $a_1$ to $a_5$, at from 240° to 350° C., preferably from 260° to 300° C. in a reaction time (mean residence time in the extruder) of from 0.1 to 15, preferably from 0.1 to 10, in particular from 0.5 to 3, minutes.

The first zone of the extruder, in which the modified polyphenylene ether is prepared, preferably has a length from 3.5 to 30 D, preferably from 10 to 25 D (where D is the diameter of the screw).

Conveyor elements are preferably mounted on the screw close to the feed orifice in the first zone; kneading elements may also be present further along. At the end of the first zone, one or more backward-conveying elements are particularly preferably present, these elements making it possible to influence the residence time in the first zone.

For the purposes of the present invention, modified PPE is a product obtained by the reaction of components ($a_1$) to ($a_5$).

Components ($a_1$) are known polyphenylene ethers which can be prepared, for example by oxidative coupling, from phenols disubstituted in the o-position. Preferably used polyphenylene ethers are those which are compatible with vinylaromatic polymers, ie. are completely or substantially soluble in these polymers (cf. A. Noshay, Block Copolymers, pages 8–10, Academic Press, 1977, and O. Olabisi, Polymer-Polymer Miscibility, 1979, pages 117–189).

The amount of component ($a_1$) is from 4.95 to 99.95, preferably from 10 to 99.95, in particular from 50 to 90, % by weight, based on the sum of components ($a_1$) to ($a_5$).

The polyphenylene ethers used generally have a weight average molecular weight of from 10,000 to 80,000, preferably from 20,000 to 60,000.

A few polyphenylene ethers, as mentioned, inter alia, by O. Olabisi, loc sit., pages 224–30 and 245, are mentioned here merely by way of example: poly(2,6-diethyl-1,4-phenylene) oxide, poly(2-methyl-6-ethyl-,1,4-phenylene) oxide, poly(2-methyl-6-propyl-1,4-phenylene) oxide, poly(2,6-dipropyl-1,4-phenylene) oxide, poly(2-ethyl-6-propyl-1,4-phenylene) oxide and preferably poly(2,6-dimethyl-1,4-phenylene) oxide, and copolymers such as those which contain units of 2,3,6-trimethylphenol, as well as polymer blends. However, poly(2,6-dimethyl-1,4-phenylene) oxide is particularly preferred.

The components ($a_2$) which may be added during the preparation of the modified polyphenylene ether, is a vinylaromatic polymer which is preferably compatible with the polyphenylene ether used.

The molecular weight of these polymers is in general from 1,500 to 2,000,000, preferably from 70,000 to 1,000,000.

Examples of preferred vinylaromatic polymers which are compatible with polyphenylene ethers are given in the abovementioned monograph by Olabisi, pages 224–230 and 245. Vinylaromatic polymers of styrene, chlorostyrene, α-methylstyrene and p-methylstyrene are mentioned here merely as typical examples; comonomers, such as (meth)acrylonitrile or (meth)acrylates, may also be present in minor amounts (preferably not more than 20, in particular not more than 8, % by weight). Particularly preferred vinylaromatic polymers are polystyrene and high impact polystyrene. Blends of these polymers can of course also be used.

Processes for the preparation of such vinylaromatic polymers are known per se and are described in the literature, so that no further information is required here.

Bulk polymerization, suspension polymerization, emulsion polymerization and solution polymerization are mentioned here, merely by way of example, as suitable polymerization processes.

The amount of vinylaromatic polymer (a$_2$) in component (A) is from 0 to 45, preferably from 1 to 35, in particular from 2 to 10, % by weight.

One or more of the compounds (a$_{31}$) to (a$_{33}$) are used as essential components (a$_3$) in the preparation of the modified polyphenylene ether (A).

In principle, it is also possible to use mixtures of different compounds (a$_{31}$) to (a$_{33}$), but it is generally advantageous to use only one of these types of compounds.

Components a$_{31}$ are α,β-unsaturated dicarbonyl compounds of the general formula IV

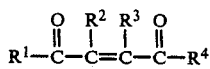

where R$^1$ and R$^4$ are each hydroxyl, aryloxy, alkoxy, aralkoxy or cycloalkoxy, each of not more than 12 carbon atoms, or together form —O— or —NR$_5$—, R$_2$ and R$_3$ are each hydrogen, alkyl or cycloalkyl, each of not more than 12 carbon atoms, aryl or chlorine, or together form alkylene of 4 to 12 carbon atoms, and R$^5$ is hydrogen, alkyl, cycloalkyl, aralkyl or aryl, each of not more than 12 carbon atoms, which in turn may be substituted by C$_1$–C$_4$-alkyl or C$_1$–C$_4$-alkoxy.

Of course, the substituents must be such that they do not hinder the modification reaction. The compounds a$_{31}$ are therefore generally α,β-unsaturated dicarboxylic acids or their anhydrides, imides, monoesters or diesters.

Examples of dicarboxylic acids are maleic acid, fumaric acid, methylmaleic acid, butenylsuccinic acid, tetrahydrophthalic acid and chloromaleic acid, fumaric acid being particularly preferred.

Maleic anhydride, methylmaleic anhydride and chloromaleic anhydride are examples of anhydrides.

Preferred imides are derived from maleic acid. Here, R$^2$, R$^3$ and R$^5$ are each alkyl of 1 to 4 carbon atoms, eg. methyl, ethyl, n-butyl, isobutyl or tertbutyl, cycloalkyl of not more than 8 carbon atoms or phenyl, and R$^{13}$ may be substituted by C$_1$–C$_4$-alkyl. Maleimides which may be mentioned merely by way of example are N-methylmaleimide, N-butylmaleimide, N-cyclohexylmaleimide, N-phenylmaleimide, N-(p-methylphenyl)maleimide, N-(3,5-dimethylphenyl)maleimide, N-benzylmaleimide, N-(naphth-1-yl)maleimide and mixtures of these. N-phenylmaleimide is particularly preferred.

The half esters are preferably derived from primary and secondary monoalcohols, such as methanol, ethanol, n-propanol, isopropanol, n-butanol, isobutanol, pentanols, hexanols, heptanols or octanols, eg. 2-ethylhexyl alcohol, and higher alcohols, such as dodecanols, and cycloaliphatic alcohols, eg. cyclohexanol. Alcohols containing aromatic structural units, eg. benzyl alcohol, are also suitable. However, alkanols of 1 to 6 carbon atoms are preferred.

Other suitable components (a$_3$) are monomers containing amide groups and one or more polymerizable double bonds, preferably those of the general formula II or III

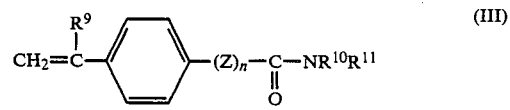

where R$^6$, R$^7$, R$^8$, R$^9$, R$^{10}$ and R$^{11}$ are each hydrogen, alkyl or alkoxy, each of 1 to 12 carbon atoms, cycloalkyl of not more than 12 carbon atoms or aryl, and Z is alkenyl of 1 to 12 carbon atoms, and n is 0 or 1, preferably 0.

Preferred substituents R$^6$, R$^7$, R$^9$ and R$^{10}$ are alkyl of 1 to 10 carbon atoms, cycloalkyl of not more than 8 carbon atoms and aryl, preferably phenyl. R$^4$ and R$^7$ are each preferably H or methyl.

Acrylamide, N-methyl-, N-ethyl-, N-propyl-, N-butyl-, N-pentyl-, N-hexyl-, N-heptyl-, N-octyl-, N-nonyl- and N-(2-ethylhexyl)-acrylamide, N-cyclohexylacrylamide, N-phenylacrylamide, the corresponding N,N-derivatives, such as N,N-dimethylacrylamide, and the corresponding methacrylamides, as well as mixtures of these, may be mentioned here as examples.

Acrylamide, methacrylamide, N-phenylacrylamide and N-phenylmethacrylamide are preferably used. Another group of preferably used monomers containing amide groups are mono- and diamides of the dicarboxylic acids, obtained when, in the general formula I (component a$_{31}$), R$^1$ and R$^4$ are each OH.

To prepare these mono- and diamides, the dicarboxylic acids or their anhydrides can be reacted with the corresponding amines. Examples of amines are secondary amines, such as N-methyl- or N-ethylalkylamines and N-alkylanilines, eg. N-methylaniline. The amount of component (a$_{32}$) is from 0.05 to 10, preferably from 0.1 to 10, in particular from 0.2 to 5, % by weight, based on the sum of components (a$_1$) to (a$_5$).

A monomer containing lactam groups and one or more polymerizable double bonds (a$_{33}$) may also be used as component (a$_3$). Lactams of the general structure IV

where X is a linear or branched alkylene group of 2 to 15 carbon atoms and Y is of the general formula

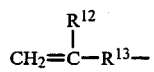

$R^{12}$ is hydrogen or an alkyl or alkoxy group of 1 to 4 carbon atoms and $R^{13}$ is a divalent substituent

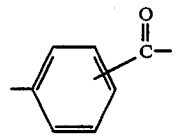

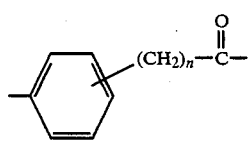

where n is an integer from 1 to 4 are preferably used.

Preferred substituents Y are, very generally, vinyl, acryloyl or methacryloyl radicals or radicals being based on the styrene structure.

Particularly preferred lactam units are those which are polymerizable or copolymerizable to give nylons, as described in Houben-Weyl, Methoden der organ. Chemie, Vol. X/2 (1958), pages 511–587, and Volume XIV/2, pages 111–131.

Examples are β-propiolactams (azetidin-2-ones), such as

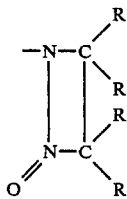

where the radicals R are identical or different alkyl groups of 1 to 6 carbon atoms or hydrogen. Compounds of this type are described by R. Graf, Angew. Chem. 74 (1962), 523–530, and H. Bastian, Angew. Chem. 80 (1968), 304–312.

3,3′-dimethyl-3-propiolactam may be mentioned merely as an example of a member of this group.

Other preferred lactam unit are 2-methylpyrrolidones

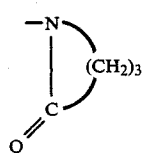

ε-caprolactam, such as

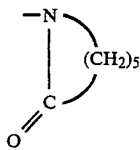

and 7-enantholactam, 8-capryllactam and 12-laurolactam, as described by K. Dachs, Angew. Chem. 74 (1962), 540–545. 2-pyrrolidones and 6-caprolactams are very particularly preferred.

Mixtures of these compounds can also be used.

The lactam units are preferably incorporated into the polyphenylene ether A via a carbonyl group on the nitrogen, as shown generally below.

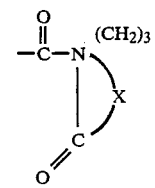

A particularly preferred example of a component ($a_{33}$) is N-(meth)acryloyl-ε-caprolactam

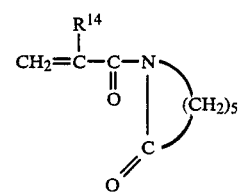

where $R^{14}$ may be hydrogen or methyl.

The amount of component ($a^{33}$) is from 0.05 to 10, preferably from 0.1 to 10, in particular from 0.5 to 5, % by weight, based on the sum of components ($a_1$) to ($a_5$).

If required, other comonomers ($a_4$) which react with, or are grafted onto, the components ($a_1$) and, if necessary ($a_2$) under the preparation conditions can also be used in the preparation of the modified polyphenylene ether A. Examples of these are acrylic acid, methacrylic acid, acrylates, methacrylates and vinylaromatic monomers such as styrene, α-methylstyrene and vinyltoluene, to mention but a few.

The amount of component ($a_4$) is from 0 to 80, preferably from 0 to 45, in particular not more than 20, % by weight, based on the sum of components ($a_1$) to ($a_5$). Particularly preferred molding materials are those which do not contain any component ($a_4$).

Up to 20% by weight of free radical initiators can be used as component ($a_5$) in the preparation of the modified polyphenylene ethers A).

The amount of component ($a_5$) is as a rule lower than the sum of the amounts of components ($a_3$) and ($a_4$). This component is preferably an organic peroxide or an azo compound.

Organic peroxides having a half-life of from 1 to 30 sec at 200° C. are particularly preferred. The choice of the free radical initiator depends on the desired reaction temperature.

Examples of free radical initiators are di-(2,4-dichlorobenzoyl) peroxide, tert-butyl peroxide, di-(3,5,5-trimethylhexanol) peroxide, dilauroyl peroxide, didecanoyl peroxide, dipropionyl peroxide, dibenzoyl peroxide, tertbutyl peroxy-2-ethylhexanoate, tert-butyl peroxydiethylacetate, tert-butyl peroxyisobutyrate, 1,1-di-tert-butylperoxy-3,3,5-trimethylcyclohexane, tert-butyl peroxyisopropylcarbonate, tert-butylperoxy-3,3,5-trimethylhexanoate, tert-butyl peracetate, tert-butyl perbenzoate, butyl 4,4-di-tert-butylperoxyvalerate, 2,2-di-tert-butylperoxybutane, dicumyl peroxide, tert-butyl cumyl peroxide, 1,3-di-(tert-butylperoxyisopropyl)benzene, di-tert-butyl peroxide, diisopropylbenzene monohydroperoxide, cumene hydroperoxide, tert-butyl hydroperoxide, 2,2-azo-di-(2,4-dimethylvaleronitrile) and azobisisobutyronitrile, dicumyl peroxide being particularly preferred.

It has frequently proven particularly advantageous to carry out the reaction without large amounts of component (a5). Accordingly, the amount of free radical initiator is preferably from 0.01 to 0.09, in particular from 0.02 to 0.08, very particularly preferably from 0.03 to 0.07, % by weight, based on the total weight of components ($a_1$) to ($a_5$). This applies in particular when fumaric acid ($a_{31}$) is used as component ($a_3$) since in this case undesirable side reactions may occur if relatively large amounts of free radical initiators are used. (B) from 5 to 95% by weight of a nylon, (C) from 0 to 90% by weight of a nonmodified PPE, (D) from 0 to 45% by weight of a vinylaromatic polymer, (E) from 0 to 40% by weight of a rubber impact modifier and (F) from 0 to 60% by weight of additives and processing assistants are added to the modified polyphenylene ether A in one or more further zones, together or via a plurality of feed orifices in different zones.

Metering is preferably effected using a side extruder which has a thermostatable barrel and in which the components B-F are metered in, melted and fed to the beginning of the second zone of the extruder.

In general, the screw diameter of the side extruder is smaller than that of the main extruder, and the screw length is from 5 to 40 D, preferably from 10 to 20 D. The temperature during metering into the main extruder is from 250° to 350° C., preferably from 260° to 320° C. The screw of the side extruder can be such that the components are premixed before being metered into the main extruder. Preferably, the components are melted in the side extruder.

The main extruder zone in which the modified polyphenylene ether A is then mixed with the components metered from the beginning of the second zone generally has a length of from 5 to 40 D, preferably from 10 to 20 D. The temperature is in the same range as that during metering in of components B-F. The mean residence times in this zone are in general from 0.1 to 10, preferably from 0.5 to 5, minutes.

In some cases, it is advantageous if all components B-F are not fed simultaneously to the main extruder. In this case, the second zone of the main extruder may be followed by one or more zones of identical design, in which the components B-F can be fed in via feed orifices. In these cases too, metering into the main extruder is effected via side extruders whose design corresponds to the form described above, or via an orifice at the top in the case of fillers, such as glass fibers. Substances may also be pumped in.

The design and dimensions of the further main extruder zones into which components are introduced correspond to the data for the second zone.

Particularly for the addition of rubbers, processing assistants and other conventional additives, it is frequently advantageous to use an extruder having more than two zones.

Components B-F which may be metered into the modified PPE via one or more feed orifices are described below.

From 5 to 95% by weight of one or more nylons are metered in as component B. Examples of suitable linear nylons are those having a relative viscosity of from 2.2 to 4.5, measured in 1% strength by weight solution in 96% strength by weight sulfuric acid at 23° C. Preferred nylons are those which are derived from lactams having 7 to 13 ring members, such as polycaprolactam, polycaprylLactam or polylaurolactam, and nylons which are obtained by reaction of dicarboxylic acids with diamines. Examples of these are nylon 6,6, nylon 6,12 and the nylon 4,6 described in EP-A No. 39 524. Examples of suitable dicarboxylic acids are alkanedicarboxylic acids of 5 to 12, in particular 6 to 10, carbon atoms and terephthalic acid and isophthalic acid, as well as any mixtures of these acids.

Examples of diamines are alkanediamines of 4 to 12, in particular 4 to 8, carbon atoms, and m-xylylenediamine, bis-(4-aminophenyl)methane, bis-(4-aminocyclohexyl)methane and 2,2-bis-(4-aminophenyl)propane and mixtures of these.

It is also possible, and sometimes advantageous, to use mixtures of the stated nylons. Nylon 6 (polycaprolactam), nylon 6,6 (polyhexamethyleneadipamide) and nylons synthesized from hexamethylenediamine and isophthalic acid or terephthalic acid have become particularly important industrially.

Preferred molding materials contain from 5 to 80, in particular from 25 to 70, % by weight of thermoplastic nylons.

It is sometimes advantageous to add an unmodified polyphenylene ether as component (C). This preferably corresponds to the polyphenylene ether used as component (a1), and in this connection reference may therefore be made to the list of suitable compounds given there. The amount of component C, where present, is not more than 90, preferably less than 50, % by weight, based on the sum of components (A) to (F).

If necessary, vinylaromatic polymers can be added in an amount of up to 45, preferably up to 30, % by weight, based on the sum of components (A) to (F), as a further component (D). Preferred substances are polymers which are compatible with polyphenylene ethers, as already described under component ($a_2$). For further details, reference may therefore be made to the list for component ($a_2$).

Component (D) may also be a toughened component. Such polymers are known to the skilled worker as high impact polystyrene (HIPS). The vinylaromatic polymers are prepared in the presence of an impact modifier or are mixed with grafted rubbers. Examples of rubber-like polymers are polybutadiene, styrene/butadiene, styrene-b-butadiene, acrylonitrile/butadiene, ethylene/propylene, polyacrylate and polyisoprene rubber.

In addition to the grafted rubbers which may be present in component D), such as polybutadiene, acrylate, styrene/butadiene, polybutene, hydrogenated styrene/butadiene, acrylonitrile/butadiene, ethylene/propylene and polyisoprene rubbers, these rubbers may also be added in ungrafted form as components (E). Other examples of rubbers (E) are styrene-grafted ethylene/propylene rubbers, thermoplastic ethylene/propylene rubbers, thermoplastic polyester elastomers, ethylene rubbers and ionomers, particularly preferably styrene-/ butadiene block copolymers, including AB, ABA, ABA taper, ABAB, ABAB taper star block copolymers and the like, similar isoprene block polymers and (partially) hydrogenated block copolymers.

Component (E) can be added to the modified PPE in amounts of up to 45, preferably up to 30, % by weight, based on the sum of components (A) to (F).

In addition to components (A) to (E), the novel thermoplastic molding materials may also contain conventional additives and processing assistants (F). The amounts of these additives is in general not more than 60, in particular not more than 40, % by weight, based on the total weight of components (A) to (F).

Examples of additives are heat stabilizers, light stabilizers, lubricants, mold release agents, colorants, such as dyes and pigments, in conventional amounts. Other additives are reinforcing agents, such as glass fibers, asbestos fibers, carbon fibers or aromatic polyamide fibers, and/or fillers, such as gypsum fibers, synthetic calcium silicates, kaolin, calcined kaolin, wollastonite, talc or chalk, or flameproofing agents, such as phosphorous compounds, eg. phosphate, phosphoric acid esters, phosphorous acid esters, phosphinic acid esters, phosphonous acid esters or organic phosphine oxides, or halogen compounds, if necessary in combination with synergistic agents, such as antimony trioxide.

Low molecular weight or high molecular weight polymers are also suitable additives.

The desired properties of the end products can be controlled to a considerable extent via the type and amount of these additives. It is in principle also possible to introduce additives and processing assistants at as early a stage as the reaction of components ($a_1$ to ($a_5$.

It should once again be pointed out that components B-F can be fed to the main extruder together in one zone, or B alone can be fed in first and then components C-F in any sequence in one or more zones, via feed means.

After all components have been added and mixed in the various main extruder zones mentioned, devolatilization can advantageously be carried out in a further zone. Suitable embodiments of such devolatilization zones are known per se. The length of this zone is preferably from 3 to 10 D, the temperature being from 250° to 300° C. Devolatilization is preferably assisted by employing reduced pressure.

After the devolatilization, the mixture prepared by the process is extruded from the extruder and then further processed in a conventional manner.

The products obtained by the novel process have a particularly pale natural color and high multiaxial toughness. Another advantage of the novel process is that modification of the PPE and mixing with the other components can be carried out in one operation, reducing the heat load on the PPE.

EXAMPLES 1 TO 12

The process was carried out using a twin-screw extruder having three zones (Werner and Pfleiderer). The screw diameter was 53 mm and the lengths of the individual zones are stated as multiples of the screw diameter (D).

The first zone of the extruder was 15 D long and had a feed orifice for solid substances $a_1$ to $a_3$ at the beginning. These substances were fed in via metering balances. Below the feed orifice, the screw elements were designed for conveying, and this zone section (3 D) was cooled to 20° C. The next zone section (3 D) was heated to 240° C. The remainder of the first zone (9 D) was at 280° C. In the middle section of the first zone, kneading elements were present on the screw. A backwardconveying element was incorporated at the end of the screw.

The second zone of the extruder was 15 D long and had a lateral feed orifice at the beginning. The remainder of the second zone was closed, except with respect to the devolatilization zone. The components B, D, E and F were fed through the lateral feed orifice into the second zone by means of a side extruder. The second zone was heated at 285° C. The screw carried kneading elements.

The side extruder was a twin-screw extruder having a screw diameter of 30 mm and a length of 17 D. The extruder barrels of the side extruder were at 280° C. At the beginning of the side extruder, the substances were fed in through metering balances, and at the end of the side extruder they were introduced into the lateral feed orifice of the second zone.

The devolatilization zone of the extruder was 6 D long and had, at the beginning, a devolatilization orifice at which a vacuum of 100 mmHg was applied. In the second section of the devolatilization zone, a pressure was built up in order to extrude the product via a die. The product was drawn through a water bath and then granulated and dried.

Specifically, the following components were used.

$a_1$: poly-(2,6-dimethyl-1,4-phenylene) ether (having a relative viscosity of 0.60, measured in 1% strength by weight CHCl$_3$ solution at 25° C.)

$a_2$/1: polystyrene PS 144 C from BASF, MFI 200/5.0=24 g/$^{10}$ min $a_2$/2: oligomeric polystyrene with M$_w$=5,000 (corresponds to component D in Example 2)

$a_2$/3: copolymer of vinyltoluene and methylstyrene (M$_w$=5,000; Picotex 120 from Hercules)

$a_3$/1: fumaric acid $a_3$/2: maleic anhydride (MA)

$a_3$/3: diethyl maleate $a_3$/4: mixture of 50% by weight of MA+50% by weight of methyl methacrylate B/1: nylon 6,6 having a relative viscosity of 3.4

B/2: nylon 6 having a relative viscosity of 3.1

D: corresponds to component $a_2$/2

E/1: styrene/butadiene/styrene block polymer, prepared by anionic polymerization (32% by weight of styrene, 68% by weight of butadiene) and having an M$_w$ of 95,000

E/2: styrene/(hydrogenated) butadiene/styrene block rubber, prepared by anionic polymerization with subsequent hydrogenation of the polybutadiene block, containing 35% by weight of styrene and 65% by weight of (hydrogenated) butadiene, M$_w$=65,000

E/3: ethylene polymer obtained from 70% by weight of ethylene, 29% by weight of n-butyl acrylate and 1% by weight of maleic anhydride and having an MFI of 20 g/10 min.

E/4: butadiene rubber, prepared by emulsion polymerization of, initially, 70% by weight of butadiene, followed by 30% by weight of styrene as a particle shell.

F/1: SiO$_2$

F/2: polyethylene wax. Table 1 shows the amounts of components used.

TABLE 1

(all data in % by weight)

| Example no. | 1 | | 2 | | 3 | | 4 | | 5 | | 6 | | 7 | | 8 | | 9 | |
|---|---|---|---|---|---|---|---|---|---|---|---|---|---|---|---|---|---|---|
| First zone | | | | | | | | | | | | | | | | | | |
| $a_1$ | 26.3 | | 38.5 | | 36.3 | | 40.6 | | 40.1 | | 40.1 | | 40.1 | | 40.1 | | 39.5 | |
| $a_2$ | 8.7 | $a_2/1$ | 4.3 | $a_2/2$ | 4.5 | $a_2/2$ | — | | 1.8 | $a_2/1$ | 1.8 | $a_2/1$ | 1.8 | $a_2/1$ | 1.8 | $a_2/1$ | 1.7 | $a_2/1$ |
| $a_3$ | 0.2 | $a_3/1$ | 0.9 | $a_3/2$ | 0.2 | $a_3/1$ | 0.6 | $a_3/1$ | 0.2 | $a_3/1$ | 0.2 | $a_3/1$ | 0.2 | $a_3/3$ | 0.2 | $a_3/1$ | 0.2 | $a_3/1$ |
| F/1 | 1.7 | F/1 | 1.7 | F/2 | — | | — | | — | | — | | — | | — | | — | |
| Second zone | | | | | | | | | | | | | | | | | | |
| B | 52.7 | B/1 | 42.7 | B/1 | 50.0 | B/2 | 49.7 | B/2 | 47.3 | B/1 | 47.3 | B/1 | 47.3 | B/1 | 47.3 | B/1 | 46.5 | B/1 |
| D | — | | 5.1 | | — | | — | | — | | — | | — | | — | | — | |
| E | 8.7 | E/1 | 6.8 | E/1 | 9.0 | E/1 | 9.1 | E/2 | 10.6 | E/1 | 10.6 | E/1 | 10.6 | E/1 | 10.6 | E/2 | 7.0 | E/1 |
| | | | | | | | | | | | | | | | | | 5.1 | E/3 |
| F | 1.7 | F1 | — | | — | | — | | — | | — | | — | | — | | — | |
| Screw speed [1/min] | | | | | | | | | | | | | | | | | | |
| Main extruder | 170 | | 150 | | 180 | | 180 | | 200 | | 200 | | 200 | | 200 | | 200 | |
| Side extruder (second zone) | 200 | | 200 | | 200 | | 200 | | 200 | | 200 | | 200 | | 200 | | 200 | |

| Example no. | 10 | | 11 | | 12 | |
|---|---|---|---|---|---|---|
| First zone | | | | | | |
| $a_1$ | 40.1 | | 40.1 | | 40.0 | |
| $a_2$ | 1.8 | $a_2/1$ | 1.8 | $a_2/1$ | 1.7 | $a_2/1$ |
| $a_3$ | 0.2 | $a_3/3$ | 0.2 | $a_3/2$ | 0.4 | $a_3/4$ |
| F/1 | — | | — | | — | |
| Second zone | | | | | | |
| B | 47.3 | B/1 | 47.3 | B/1 | 47.3 | B/1 |
| D | | | | | | |
| E | 10.6 | E/4 | 10.6 | E/4 | 10.6 | E/1 |
| F | | | | | | |
| Screw speed [1/min] | | | | | | |
| Main extruder | 200 | | 200 | | 200 | |
| Side extruder (second zone) | 200 | | 200 | | 200 | |

Comparative Examples for Examples 3, 5 and 6

COMPARATIVE EXAMPLES 3.1, 5.1 AND 6.1

The components $a_1$-$a_3$, B and D were all metered together into the first zone of the main extruder and mixed in the latter.

COMPARATIVE EXAMPLES 3.2, 5.2 AND 6.2

The components a1-a3 were metered into the first zone, fed via the main extruder, extruded and granulated. In a second pass, the components B and D with the granules were metered into the first zone, fed via the main extruder and mixed.

COMPARATIVE EXAMPLES 3.3, 5.3 AND 6.3

The components $a_1$ and $a_3$ (without components $a_2$) were metered into the first zone, and B and D were metered into the second zone.

COMPARATIVE EXAMPLES 3.4, 5.4 AND 6.4

The components $a_1$ and $a_3$ were metered into the first zone and components $a_2$, B and D into the second zone and mixed in the main extruder.

The results of the measurements of impact strength (according to DIN No. 53,453), notched impact strength (according to DIN No. 53,453) and total penetration energy (according to DIN No. 53,443) are shown in Table 2. The relevant test specimens were prepared by injection molding.

TABLE 2

(C = Comparative Experiments)

| Example no. | DIN 53,453 Impact strength kJ/m$^2$ | DIN 53,453 Notched impact strength kJ/m$^2$ | DIN 53,453 Total penetration energy Nm | Color |
|---|---|---|---|---|
| 1 | no fracture | 22 | 50 | virtually white |
| 2 | no fracture | 16 | 29 | yellow |
| 3 | no fracture | 25 | 57 | pale yellow |
| 3.1 C | 24 | 4.1 | <5 | brown |
| 3.2 C | no fracture | 14 | 38 | brown |
| 3.3 C | 7 | 1.1 | <5 | brown |
| 3.4 C | 15 | 3.0 | <5 | dark brown |
| 4 | no fracture | 20 | 48 | pale yellow |
| 5 | no fracture | 28 | 64 | pale yellow |
| 5.1 C | 20 | 3.7 | <5 | brown |
| 5.2 C | no fracture | 18 | 34 | brown |
| 5.3 C | 10 | 2.0 | <5 | brown |
| 5.4 C | 20 | 5.0 | <5 | dark brown |
| 6 | no fracture | 18 | 48 | yellow |
| 6.1 C | 10 | 2.0 | <5 | dark brown |
| 6.2 C | no fracture | 9 | 36 | brown |
| 6.3 C | 7 | 2.1 | <5 | brown |
| 6.4 C | 15 | 1.3 | <5 | dark brown |
| 7 | no fracture | 19 | 50 | yellow |
| 8 | no fracture | 22 | 58 | pale yellow |
| 9 | no fracture | 15 | 45 | pale yellow |
| 10 | no fracture | 17 | 40 | pale yellow |
| 11 | no fracture | 13 | 32 | pale yellow |
| 12 | no fracture | 15 | 43 | pale yellow |

EXAMPLES 13 TO 16

In these Examples, a twin-screw extruder having four zones and a screw diameter of 53 mm was used. The first zone had a length of 20 D and its design corresponded to the first zone of the extruder in Examples 1 to 12. The second zone was 12 D long and was otherwise similar to the second zone of the extruder of Examples 1 to 12.

The third zone was 6 D long and had at the beginning a feed orifice above which was a dome flushed with $N_2$ and open at the top. The substances E and F were fed in via metering balances, and glass fibers were drawn in via the screw of the main extruder.

The fourth zone (devolatilization zone) corresponded to that of the extruder in Examples 1 to 12.

Table 3 shows the proportions in which the individual components are mixed.

Components $a_1$, $a_2$, $a_3$, B and E correspond to the components used in Examples 1 to 12.

The following were used in addition:
$a_4$: acrylic acid
F/3 talc
F/5 glass fibers
F/6 titanium dioxide
F/7 tris(nonylphenyl) phosphate
F/8 zinc oxide
F/9 zinc sulfide
F/10 kaolin

TABLE 3

(all data in % by weight)

| | Example 13 | | Example 14 | | Example 15 | | Example 16 | |
|---|---|---|---|---|---|---|---|---|
| Zone 1 | | | | | | | | |
| Screw speed [1/min] | 220 | | 220 | | 220 | | 250 | |
| $a_1$ | 17.73 | | 23.5 | | 29.7 | | 45.9 | |
| $a_2$ | 14.20 | | — | | 0.8 | $a_2/1$ | 1.3 | $a_2/2$ |
| $a_3$ | 0.70 | $a_3/3$ | 0.7 | $a_3/1$ | 0.8 | $a_3/1$ | 0.7 | $a_3/1$ |
| $a_4$ | 0.07 | $a_4$ | — | | — | | — | |
| F | — | | 2.0 | F/2 | — | | — | |
| Zone 2 | | | | | | | | |
| B | 39.0 | B/1 | 43.6 | B/1 | 55.1 | B/1 | 16.5 | B/1 |
| D | | | | | | | 8.2 | |
| E | 7.0 | E/1 | 6.7 | E/2 | 8.5 | E/1 | 16.5 | E/2 |
| F | 1.40 | F/3 | 2.0 | F/3 | — | | — | |
| Screw speed [1/min] (Side extruder) | 200 | | 200 | | 200 | | 100 | |
| Zone 3 | | | | | | | | |
| B | 1.4 | B/1 | — | | — | | — | |
| E | | | 6.7 | E/2 | — | | — | |
| F | 17.7 | F/5 | 13.4 | F/10 | 2.5 | F/7 | 4.9 | F/7 |
| | | | 1.4 | F/6 | 1.7 | F/6 | 1.6 | F/8 |
| | | | | | 0.9 | F/8 | 0.6 | F/9 |

Comparative Examples for Example 15

COMPARATIVE EXAMPLE 15.1

Components $a_1$–$a_3$, B, D and E were all metered together into the first zone and mixed in the main extruder, while component F was metered into the third zone.

COMPARATIVE EXAMPLE 15.2

Components $a_1$–$a_3$ were metered into the first zone, fed via the main extruder, extruded and granulated. In a second pass, the components B, D and E with the granules of the mixture prepared from a1-a3 were metered into the first zone, and components F were metered into the third zone and mixed in the main extruder.

COMPARATIVE EXAMPLE 15.3

Components $a_1$ and $a_2$, without components $a_3$, were metered into the first zone, B, D and E into the second zone and components F into the third zone.

COMPARATIVE EXAMPLE 15.4

Components $a_1$ and $a_2$ were metered into the first zone, components $a_3$, B, D and E into the second zone and components F into the third zone.

The results of the measurements are shown in Table 4.

TABLE 4

(C = Comparative Experiments)

| Example no. | DIN 53,453 Impact strength kJ/m² | DIN 53,453 Notched impact strength kJ/m² | DIN 53,453 Total penetration energy Nm | Color |
|---|---|---|---|---|
| 13 | 60 | 18 | — | white |
| 14 | 56 | 8 | — | white |
| 15 | no fracture | 28 | 50 | white |
| 15.1 C | 10 | 2.1 | <5 | pale brown |
| 15.2 C | no fracture | 10 | 22 | brown |
| 15.3 C | 11 | 2.5 | <5 | pale brown |
| 15.4 C | 17 | 2.0 | <5 | pale brown |
| 16 | no fracture | 18 | 39 | white |

EXAMPLES 17 To 28

Examples 1 to 12 were repeated, except that 0.05% by weight of tert-butyl hydroperoxide was additionally used in the reaction in the first zone, the amount of PPE ($A_1$) accordingly being reduced by 0.05% by weight. Otherwise, the compositions of Examples 17 to 28 correspond to those of Examples 1 to 12 (in this order, ie. 17=1, 18=2, . . . etc.).

After extrusion, granulation and drying, test specimens were prepared as in Examples 1 to 12 by injection molding, and the mechanical properties were determined.

The results of these measurements are shown in Table 5.

TABLE 5

| Example no. | DIN 53,453 Impact strength kJ/m² | DIN 53,453 Notched impact strength kJ/m² | DIN 53,453 Total penetration energy Nm |
|---|---|---|---|
| 17 | no fracture | 23.7 | 53 |
| 18 | no fracture | 16.5 | 31 |
| 19 | no fracture | 26.8 | 60 |

TABLE 5-continued

| Example no. | DIN 53,453 Impact strength kJ/m² | DIN 53,453 Notched impact strength kJ/m² | DIN 53,453 Total penetration energy Nm |
|---|---|---|---|
| 20 | no fracture | 22.4 | 51 |
| 21 | no fracture | 30.1 | 68 |
| 22 | no fracture | 18 | 50 |
| 23 | no fracture | 20.0 | 52 |
| 24 | no fracture | 21.9 | 59 |
| 25 | no fracture | 16.5 | 47 |
| 26 | no fracture | 19.0 | 43 |
| 27 | no fracture | 14.0 | 34 |
| 28 | no fracture | 17.0 | 46 |

We claim

1. A continuous process for the preparation of a thermoplastic molding material based on polyphenylene ethers (PPE) and nylons in an extruder, wherein
   (I) in a first zone at from 240° to 350° C.,
   (a₁) from 50 to 99.95% by weight of a polyphenylene ether,
   (a₂) from 0 to 45% by weight of a vinylaromatic polymer,
   (a₃) from 0.05 to 10% by weight of one or more monomers selected from the group consisting of
   (a₃₁) α,β-unsaturated carboxylic acids or their derivatives of the general formula I

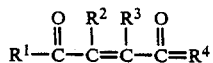

wherein R₁ and R₄ are each hydroxyl, aryloxy, alkoxy, artalkoxy, cycloalkoxy, each of not more than 12 carbon atoms, together form —O— or —NR₅—; R₂ and R₃ are each hydrogen, alkylo, cycloalkyl, each of not more than 12 carbon atoms, aryl, chlorine, or together form alkylene of 4 to 12 carbon atoms; the R⁵ is hydrogen, the moiety of alkyl, cycloalkyl, aralkyl, aryl, each moiety being not more than 12 carbon atoms, or the moiety is substituted by C₁-C₄-alkyl or -alkoxy,
   (a₃₂) monomers containing amide groups and a polymerizable double bond and
   (a₃₃) monomers containing lactam groups and a polymerizable double bond,
   (a₄) from 0 to 80% by weight of further graft monomers and
   (a₅) from 0 to 20% by weight of a free radical initiator, the percentages in each case being based on the total weight of components a₁ to a₅, are reacted for from 0.1 to 15 minutes, and a modified polyphenylene ether A is prepared, and
   (II) then, without cooling the modified polyphenylene ether, in one or more further zones of the extruder at from 250° to 350° C.,
   (B) from 5 to 95% by weight of a nylon,
   (C) from 0 to 90% by weight of a nonmodified polyphenylene ether,
   (D) from 0 to 45% by weight of a vinylaromatic polymer,
   (E) from 0 to 40% by weight of a rubber impact modifier and
   (F) from 0 to 60% by weight of additives and processing assistants, the percentages being based on the total weight of components A-F, are added, and the resulting mixture is extruded.

2. The process as claimed in claim 1, wherein from 0.01 to 0.09% by weight of a free radical initiator a₅ is used in the reaction in the first zone.

3. The process as claimed in claim 1, wherein the components E, F or a mixture thereof are added in a third zone, after the components B, C and D added in the second zone.

4. The process as claimed in claim 1, wherein the mixture of components A to F is devolatized in a further zone of the extruder.

* * * * *